United States Patent
Ortiz et al.

(10) Patent No.: US 7,235,624 B2
(45) Date of Patent: *Jun. 26, 2007

(54) CHARGE DISSIPATION MODIFIERS FOR OLEFINIC INTERPOLYMER COMPOSITIONS

(75) Inventors: Carlos Gilberto Ortiz, Houston, TX (US); Peter Anthony Fox, Galveston, TX (US); Raymond L. Laakso, Jr., St. Francisville, LA (US); Gary R. Marchand, Lake Jackson, TX (US); Steven R. Oriani, Landenberg, PA (US); Walter Werner Schmiegel, Wilmington, DE (US); Michael K. Laughner, Lake Jackson, TX (US); Deepak R. Parikh, Singapore (SG)

(73) Assignee: Dow Global Technologies Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/508,710

(22) Filed: Aug. 23, 2006

(65) Prior Publication Data

US 2006/0287415 A1    Dec. 21, 2006

Related U.S. Application Data

(63) Continuation of application No. 10/691,163, filed on Oct. 22, 2003, now Pat. No. 7,144,934.

(60) Provisional application No. 60/420,879, filed on Oct. 24, 2002.

(51) Int. Cl.
*C08F 6/00* (2006.01)
*C08K 5/17* (2006.01)
*H01B 7/00* (2006.01)

(52) U.S. Cl. .............. 528/492; 528/490; 526/65; 524/99; 524/140; 524/251; 524/554; 524/570; 524/579; 174/110 SR; 174/137 B

(58) Field of Classification Search .......... 524/99, 524/140, 251, 554, 570, 579; 528/490, 492; 526/65; 174/110 SR, 137 B
See application file for complete search history.

(56) References Cited

U.S. PATENT DOCUMENTS

| 3,076,795 | A | 2/1963 | Hall |
| 3,522,183 | A | 7/1970 | Heidt |
| 3,590,026 | A | 6/1971 | Carlson et al. |
| 3,819,591 | A | 6/1974 | Campbell et al. |
| 5,883,178 | A | 3/1999 | Ohmoto et al. |
| 5,965,756 | A | 10/1999 | McAdon et al. |
| 6,127,497 | A | 10/2000 | Matsunaga et al. |
| 6,143,682 | A | 11/2000 | Fisher |
| 6,160,066 | A | 12/2000 | Canich |
| 6,825,253 | B2 | 11/2004 | Easter |
| 7,144,934 | B2 * | 12/2006 | Ortiz et al. .......... 524/99 |
| 2005/0133248 | A1 | 6/2005 | Easter |
| 2005/0252680 | A1 | 11/2005 | Easter |

FOREIGN PATENT DOCUMENTS

| DE | 2139599 | 2/1973 |
| DE | 2234065 | 1/1974 |
| JP | 11268145 | 5/1999 |
| WO | WO-98/49212 | 11/1998 |
| WO | WO-00/02891 | 1/2000 |

* cited by examiner

*Primary Examiner*—Fred Teskin

(57) ABSTRACT

Olefinic interpolymer compositions comprising the olefinic interpolymer, residuals from a transition metal catalyst and boron containing activator package, and a charge dissipation modifier and methods for making them. The compositions have dissipation factors that are at least 50% less than the corresponding olefinic interpolymer compositions which have not been treated with charge dissipation modifiers. The compositions are useful in wire and cable applications.

20 Claims, No Drawings

CHARGE DISSIPATION MODIFIERS FOR OLEFINIC INTERPOLYMER COMPOSITIONS

CROSS-REFERENCE TO RELATED APPLICATIONS

This application is a continuation application of U.S. application Ser. No. 10/691,163, filed Oct. 22, 2003, now U.S. Pat. No. 7,144,934, which claims the benefit of U.S. Provisional Application No. 60/420,879, filed Oct. 24, 2002, incorporated herein by reference.

FIELD OF THE INVENTION

The present invention relates to olefinic interpolymer compositions comprising an olefinic interpolymer, post-reactor residuals of a transition metal catalyst and a boron containing activator package, and a charge dissipation modifier. In another aspect, this invention relates to a process for lowering the dissipation factor of olefinic interpolymer compositions prepared with a transition metal catalyst in combination with a boron containing activator package, by addition of a charge dissipation modifier to the interpolymer composition. In yet another aspect, the invention relates to wire and cable (W&C) products containing these olefinic interpolymer compositions.

BACKGROUND OF THE INVENTION

The discovery of transition metal catalysts, especially metallocene and constrained geometry catalysts, for the preparation of olefinic interpolymers has resulted in the synthesis of a wide range of new and useful olefinic interpolymer compositions. These transition metal catalysts are typically activated with boron containing activator packages. Following polymer formation, the catalyst-activator systems are deactivated by addition of water, methanol, or other catalyst deactivation agents. After isolation, the resulting olefinic interpolymer compositions retain residuals of the catalyst-activator systems and typically have dissipation factors greater than 0.10. A dissipation factor as low as possible is desired for olefinic interpolymer compositions in electrical applications. The olefinic interpolymer compositions can be acid washed or steam stripped to remove or reduce catalyst and activator residuals which further can lower the dissipation factor of the olefinic interpolymer composition to 0.01 or less depending on how the composition is washed or steam stripped. U.S. Pat. No. 3,819,591 provides examples of acid washing techniques and U.S. Pat. No. 3,076,795 and U.S. Pat. No. 3,590,026 provide examples of steam stripping techniques. While these techniques may effectively lower the dissipation factor, acid washing and steam stripping add an additional step and additional manufacturing costs to the preparation of the olefinic interpolymer compositions and are environmentally undesirable as each creates an additional waste stream, which must be disposed.

It has now been surprisingly discovered that by adding specific charge dissipation modifiers to olefinic interpolymer compositions prepared with transition metal catalysts and boron containing activator packages, the dissipation factors can be lowered to levels which are at least about 50% less than dissipation factors of the corresponding olefinic interpolymer compositions which have not been treated with the charge dissipation modifiers, thus providing simpler, lower cost, more environmentally friendly olefinic interpolymer compositions for electrical applications, particularly low and medium voltage wire and cable insulation and jacketing.

SUMMARY OF THE INVENTION

One aspect of this invention is an olefinic interpolymer composition comprising an olefinic interpolymer, post-reactor residuals of a transition metal catalyst and a boron containing activator package, and a charge dissipation modifier, the composition having a dissipation factor which is at least about 50% lower than the same olefinic interpolymer composition not containing a charge dissipation modifier of this invention, the charge dissipation modifier being selected from:

a) amine compounds of the formula (I) an (II):

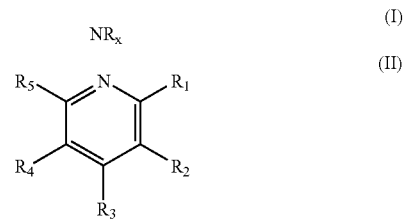

wherein x is 3 and each R is independently selected from linear, branched and cyclic hydrocarbyl groups and hydrogen or together two or more R substituents are a cyclic hydrocarbyl group and each $R_{1-5}$ is independently selected from linear, branched and cyclic hydrocarbyl groups and hydrogen or together two or more of the $R_{1-5}$ substituents are a cyclic hydrocarbyl group;

b) silica compounds; and c) phosphoric acid and mixtures thereof.

Another aspect of this invention is a process for improving the electrical properties of an olefinic interpolymer composition prepared with a transition metal catalyst and boron containing activator package, by adding a charge dissipation modifier to the olefinic interpolymer composition. The charge dissipation modifier can be added to a solution polymerization process as soon as the desired level of polymerization is attained. Thus, the charge dissipation modifier can be added to an olefinic interpolymer composition-solvent solution after the solution exits the reactor in a continuous solution process or if a solution batch process is being used, added directly into the reactor vessel after the polymerization has reached the desired level of completion or added to the solution after it has been removed from the reactor. Additionally, the charge dissipation modifier can be added to a solid olefinic interpolymer composition which has been prepared by a slurry or gas phase process and isolated. The charge dissipation modifier is added using methods known in the art to intimately mix the olefinic interpolymer composition and the charge dissipation modifier.

Yet another aspect of the invention is a wire and cable product containing an olefinic interpolymer composition of this invention.

DESCRIPTION OF THE PREFERRED EMBODIMENTS

The olefinic interpolymer compositions which show improved dissipation factors after addition of a charge dissipation modifier of the invention are prepared in a polymerization process which employs a transition metal catalyst and a boron containing activator package. In general, such polymerizations may be conducted in a solution, slurry, or gas phase process and under conditions well known in the art for Ziegler-Natta or Kaminsky-Sinn type polymerization reactions, that is, temperatures from 0–250° C., preferably 30 to 200° C., and pressures from atmospheric to 10,000 atmospheres.

The olefinic interpolymers are prepared from at least one $C_{2-20}$ α-olefin monomer and optionally, at least one polyene monomer. The α-olefin may be an aliphatic, an aromatic or a cyclic compound, such as cyclobutene, cyclopentene, or norbornene, including norbornene substituted in the 5 and 6 position with $C_{1-20}$ hydrocarbyl groups. The α-olefin is preferably a $C_{2-20}$ aliphatic compound, more preferably a $C_{2-16}$ aliphatic compound. Preferred α-olefin monomers include 4-vinylcyclohexene, vinylcyclohexane, norbornadiene and $C_{2-10}$ aliphatic α-olefins (especially ethylene, propylene, isobutylene, butene-1, pentene-1, hexene-1,3-methyl-l-pentene, 4-methyl-l-pentene, octene-1, decene-1, dodecene-1 and styrene), and mixtures thereof. Most preferred monomers are ethylene, and mixtures of ethylene with at least one of propylene, 4-methyl-l-pentene, butene-1, hexene-1, octene-1 and styrene.

The polyene monomer, if employed, can be either a crosslinking site or a branching site or both. Each polyene monomer is desirably a $C_{4-40}$ diene monomer (also referred to herein as a "diolefin") and more desirably is a nonconjugated diolefin. The nonconjugated diolefin can be a $C_{6-15}$ straight chain, branched chain or cyclic hydrocarbon diene. Illustrative nonconjugated dienes are straight chain acyclic dienes such as 1,4-hexadiene, 1,5-heptadiene, and 1,6-octadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,7-octadiene, 1,9-decadiene and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes such as tetrahydroindene, methyl tetrahydroindene, dicyclopentadiene, bicyclo-(2,2,1)-hepta-2,5-diene (norbornadiene), methyl norbornadiene; alkenyl, alkylidene, cycloalkenyl and cycloalkylidene norbornenes such as 5-methylene-2-norbornene (MNB), 5-ethylidiene-2-norbornene (ENB), 5-vinyl-2-norbornene (VNB), 5-propenyl-2-norbornene, 5-isopropylidene-2-norbornene, 5-(4-cyclopentenyl)-2-norbornene and 5-cyclohexylidene-2-norbornene.

When the diolefin is a conjugated diene, it can be 1,3-pentadiene, 1,3-butadiene, 2-methyl-1,3-butadiene, 4-methyl-1,3-pentadiene, or 1,3-cyclopentadiene. The diene is preferably a nonconjugated diene selected from ENB, 1,4-hexadiene and norbornadiene, more preferably, ENB.

Examples of transition metal catalysts which, in combination with boron containing activator packages, typically produce olefinic interpolymer compositions with dissipation factors greater than 0.10 are listed in WO 98/49212, U.S. Pat. No. 5,965,756, U.S. Pat. No. 6,160,066, U.S. Pat. No. 6,143,682, WO 00/02891, WO 00/02891, and U.S. Pat. No. 6,127,497 (late transition metal catalysts), the contents of which are incorporated by reference. These catalysts can be used separately or in combination (dual catalyst systems) and in continuous or batch reactor processes employing single or multiple reactors.

The transition metal catalysts are rendered catalytically active by a boron containing activator package. The activator package contains a boron compound and optionally, an aluminum compound. Examples of boron compounds which can be used in the activator package include, but are not limited to, fluorinated tri(hydrocarbyl)boron compounds (including perfluorinated derivatives thereof) having from 1 to 10 carbon atoms in each hydrocarbyl or fluorinated hydrocarbyl group. Perfluorinated tri(aryl)boron compounds are preferred. Most preferred is tris(pentafluorophenyl)borane (hereinafter "FAB"). As mentioned above, these boron compounds can be used as the sole component of the activator package or preferably, they can be used in combination with an aluminum compound. Examples of an aluminum compound include, but are not limited to, a trialkyl aluminum compound having from 1 to 4 carbon atoms in each alkyl group or a polymeric or oligomeric alumoxane. A preferred activator package combines a fluorinated tri(hydrocarbyl) boron compound having from 1 to 20 carbon atoms in each hydrocarbyl group, most preferably FAB, with a trialkyl aluminum compound having from 1 to 4 carbon atoms in each alkyl group. Another preferred activator package combines FAB and triisobutyl aluminum modified methylalumoxane (MMAO). Both preferred activator packages are combinations which are efficient at producing olefinic interpolymers used in this invention but the resulting olefinic interpolymer compositions typically have dissipation factors greater than 0.10.

Borates are not boron compounds used in the activator packages of this invention and are not boron species of this invention.

When these transition metal catalysts and activator packages are used in a solution process to prepare olefinic interpolymer compositions, suitable inert solvents for these solution polymerizations include, for example, straight and branched-chain hydrocarbons such as isobutane, butane, pentane, hexane, heptane, octane, as well as mixtures of alkanes including kerosene and isoparafins, cyclic and alicyclic hydrocarbons such as cyclohexane, cycloheptane, methylcyclohexane, methylcycloheptane, and mixtures thereof; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 4-vinylcyclohexene, vinylcyclohexane, 3-methyl-l-pentene, 4-methyl-l-pentene, 1,4-hexadiene, 1-octene, 1-decene, styrene, divinylbenzene, allylbenzene, and vinyltoluene (including all isomers alone or in a mixture). Mixtures of the foregoing are also suitable. If desired, normally gaseous olefins can be converted to liquids by application of pressure and used as inert liquids.

Adding charge dissipation modifiers of this invention to olefinic interpolymer compositions prepared with transition metal catalysts and boron containing activator packages can lower the dissipation factor by at least about 50% compared to the same olefinic interpolymer compositions which have not been treated with charge dissipation modifiers of this invention. Preferably, a sufficient amount of charge dissipation modifier of this invention is added to the olefinic interpolymer composition to lower the dissipation factor to less than 0.12, preferably less than 0.10, more preferably less than 0.05, and most preferably less than 0.01 without post-treatment of the olefinic interpolymer composition by acid washing or steam stripping.

Although not wishing to be bound by any particular theory, it is believed that in order for the charge dissipation modifier to function properly, it must be able to physically interact with or contact the activator/catalyst residuals from the polymerization reaction to form an olefinic interpolymer composition having a dissipation factor about 50% less than the corresponding untreated olefinic interpolymer composition. Such an interaction can only take place if the olefinic interpolymer composition and the charge dissipation modifier are intimately mixed, for example, in solution or in the melt state.

A preferred method for adding the charge dissipation modifier to the olefinic interpolymer composition is to add the charge dissipation modifier to an olefinic interpolymer composition-solvent solution resulting from a solution polymerization process.

When the charge dissipation modifier is added to an olefinic interpolymer composition-solvent solution, it has the ability to function both as a deactivation agent and a charge dissipation modifier. When the charge dissipation modifier is also the deactivation agent, no additional deactivation agent need be added to the olefinic interpolymer composition-solvent solution. However, a separate deactivation agent such as water or methanol is typically added to the solution in combination with a charge dissipation modifier. The charge dissipation modifier can be used in both continuous and batch reactor processes and in processes using single or multiple reactors in series or parallel. Whether added as a combination deactivation agent and charge dissipation modifier or solely as a charge dissipation modifier in a continuous process, the charge dissipation modifier is preferably added to the exit stream from the reactor.

When used in a single reactor continuous process and as either a combination deactivation agent/charge dissipation modifier or solely as a charge dissipation modifier, the charge dissipation modifier is preferably added to the interpolymer composition-solvent solution at any point after the solution leaves the reactor and the interpolymer composition is still in solution. If employing a dual reactor or multiple reactor continuous process in series, the charge dissipation modifier is preferably added after the interpolymer composition-solvent solution leaves the last reactor and the interpolymer composition is still in solution. If the continuous process is a multiple reactor parallel process, the charge dissipation modifier can be added after the solution leaves each reactor or after all the reactor exit streams are combined. In a batch solution process, the charge dissipation modifier is preferably added to the reaction vessel when the reaction has reached its desired level of completion.

When a separate deactivation agent is used, the deactivation agent can be added in combination with the charge dissipation modifier at the same point as the charge dissipation modifier, before the charge dissipation modifier is added to the interpolymer composition-solvent solution, or after the charge dissipation modifier is added to the interpolymer composition-solvent solution as long as the polymerization reaction has reached the desired level of completion and preferably before the solvent is removed from the olefinic interpolymer composition-solvent solution.

When a separate deactivation agent is added to the olefinic interpolymer composition, the dissipation factor is typically greater than about 0.10. Levels below about 0.10 are not typically obtained by use of deactivation agents such as water and methanol.

It should be noted that in general, the higher the efficiency of the transition metal catalyst and activator package, the lower the dissipation factor of the resulting olefinic interpolymer. In situations of high catalyst/activator efficiency (e.g., efficiencies of 10 million grams polymer/gram transition metal and greater), addition of a charge dissipation modifier may not be necessary for the material to be used in some electrical applications. However, if a charge dissipation modifier is used, the dissipation factor will most likely be improved, but the improvement may not approach the 50% level.

Another method for adding the charge dissipation modifier to the olefinic interpolymer composition is to add a charge dissipation modifier to the olefinic interpolymer composition after it has been isolated as a solid from a solution, slurry, or gas phase process. When this method of charge dissipation modifier addition is employed, the olefinic interpolymer composition and charge dissipation modifier must be intimately mixed together so that the charge dissipation modifier and the catalyst/activator residuals come into sufficient physical contact with each other to lower the interpolymer composition dissipation factor by at least about 50%. Examples of methods to accomplish this include, but are not limited to, melt blending the olefinic interpolymer with the charge dissipation modifier in an extruder or other melt blending apparatus or redissolving the olefinic interpolymer in a suitable solvent and treating the solution containing the olefinic interpolymer with a charge dissipation modifier.

Yet, another method for adding the charge dissipation modifier to an olefinic interpolymer compositions is to blend an olefinic interpolymer composition which has been treated with an excess of charge dissipation modifier with an olefinic interpolymer composition which has not been treated with a charge dissipation modifier. The compositions can be blended by known methods in the art such as melt blending in an extruder.

Charge dissipation modifiers which, when added to olefinic interpolymer compositions, lower the dissipation factor of the compositions by at least about 50% include:

a) amine compounds of the formula (I) and (II):

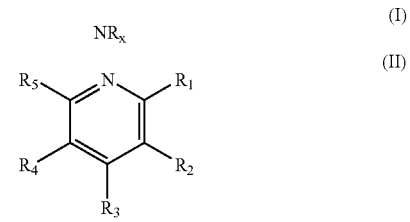

wherein x is 3 and each R is independently selected from linear, branched and cyclic hydrocarbyl groups and hydrogen or together two or more R substituents are a cyclic hydrocarbyl group and each $R_{1-5}$ is independently selected from linear, branched and cyclic hydrocarbyl groups and hydrogen or together two or more of the $R_{1-5}$ substituents are a cyclic hydrocarbyl group;

b) silica compounds; and c) phosphoric acid and mixtures thereof.

The amine compounds used as charge dissipation modifiers in this invention can be any primary amine, secondary amine, tertiary amine, or ammonia. The R and $R_{1-5}$ groups can be any hydrocarbyl group such as linear, branched, or cyclic aliphatic or aromatic compounds, preferably a $C_1$–$C_{50}$ aliphatic compound, more preferably a $C_3$–$C_{20}$ aliphatic compound. Examples of amine compounds include aniline, isopropylamine, ammonia, pyridine, and most preferably N, N-octadecyl methyl amine (also referred to herein as "bis-tallowalkyl methyl amine").

The silica compounds used as charge dissipation modifiers in this invention include $SiO_2$ in any form. Preferred are surface modified silica and high surface area silica. Most preferred is hydrophobic silica.

The amount of charge dissipation modifier added to the olefinic interpolymer composition can be determined by the amount of transition metal catalyst or by the amount of boron containing compound used to prepare the interpolymer. The lower the catalyst efficiency, the greater the amount of catalyst needed to prepare a given quantity of interpolymer and the more charge dissipation modifier needed to lower the dissipation factor of the interpolymer composition by at least about 50%. Preferably, the amount of charge dissipation modifier added is sufficient to reduce the dissipation factor to less than 0.12, more preferably less than 0.10. For purposes of this invention, the amount of metal atom from the transition metal catalyst in the interpolymer composition is used to determine the amount of charge dissipation modifier needed. Preferably, the transition metal atom (titanium, zirconium and hafnium for example) to charge dissipation modifier ratio is at least 1:1000, more preferably at least 1:100, and most preferably at least 1:10.

The physical properties such as melting point, glass transition temperature, and molecular weight distribution of olefinic interpolymers prepared with transition metal catalyst and boron containing activator packages do not appear to be affected by addition of the charge dissipation modifier(s) of this invention. Olefinic interpolymer compositions, which have been treated with charge dissipation modifier(s) of this invention, have dissipation factors sufficiently low for use in most wire and cable insulation and jacketing applications. For most low voltage applications a dissipation factor less than or equal to about 0.10 is required. For medium voltage applications, a dissipation factor less than or equal to about 0.01 is required. These dissipation factors are not absolute and the determining factor in whether or not a particular product can be used in low and medium voltage wire and cable insulation and jacketing is whether or not the product passes long term underwater testing. Typically, products which do not have dissipation factors less than about 0.10 fail such tests.

The following examples illustrate but do not, either explicitly or by implication, limit the present invention. Unless otherwise stated, all parts and percentages are by weight, on a total weight basis. Numeric ranges include the end points unless stated otherwise. Examples of the present invention are identified by Arabic numerals and comparative examples are represented by letters of the alphabet.

EXAMPLES

Except as specifically stated below, the continuous polymerization process as described in WO 98/49212 for the preparation of Examples 4–7 was used to prepare the olefinic interpolymer composition-solvent solutions used in the Examples of this invention and the Comparative Examples. The process was designed for continuous addition of reactants and continuous removal of polymer solution, devolatilization of solvent and unreacted monomers, and polymer recovery. Ethylene, propylene and ENB monomers, titanium [N-(1,1-dimethylethyl)-1,1-dimethyl-1-(1,2,3,3a,8a-eta)-1,5,6,7-tetrahydro-2-methyl-s-indacen-1-yl]silanaminato(2-)-.kappa.N][(1,2,3,4-eta)-1,3-pentadiene catalyst (also referred to as (t-butylamido)dimethyl(5-2-methyl-s-indacen-1-yl)silane titanium (II) 1,3-pentadiene catalyst), a boron containing activator package consisting of a combination of FAB and MMAO, and Isopar-E solvent were continuously added and/or recycled to a single reactor.

In the Examples, charge dissipation modifier solutions were prepared with an Isopar-E solvent and introduced into the hot olefinic interpolymer composition-solvent solution after the solution exited the reactor. The concentration of the charge dissipation modifier solution was adjusted manually, based on catalyst efficiency, to maintain a titanium metal to charge dissipation modifier molar ratio of 1:1000. The olefinic interpolymer composition-solvent solution flow was maintained for at least two hours prior to collection of the interpolymer composition. The olefinic interpolymer composition-solvent solution containing the charge dissipation modifier was pumped through a static mixer and a post-reactor heater. The post-reactor heater temperature was maintained at 150° C. The interpolymer composition was pumped into a separator, where unreacted comonomers, unreacted hydrogen, unreacted ENB, and solvent were volatilized, yielding a molten interpolymer composition comprising an ethylene/propylene/diene interpolymer ("EPDM"), the charge dissipation modifier and residuals of catalyst and activator. After collection of the interpolymer composition was complete, charge dissipation modifier solution flow was shut off, and the system purged with untreated interpolymer composition for at least two hours to clear the separator of any material that had been treated by a charge dissipation modifier. The charge dissipation modifier additive tank was flushed with fresh solvent prior to adding the new charge dissipation modifier solution to prevent cross contamination of the charge dissipation modifier. After collection, the interpolymer composition was dried at 115° C. in a vacuum oven for at least 8 hours to ensure complete solvent devolatilization.

Except as specifically explained later, compositions of the Comparative Examples were made in the same way as described in the preceding paragraph except deactivation agents were added in place of the charge dissipation modifiers. The deactivation agents in the Comparative Examples were used as received and without further purification. Water and methanol were purchased from Fisher Scientific International Inc. PEP-Q was obtained from Clariant Corp. Tripropylphosphate and phosphoric acid were obtained from Aldrich Chemical Company (now Sigma-Aldrich Company). Silica (AEROSIL® R 972, a fumed hydrophobic silica) was obtained from Degussa Corp. Bis-tallowalkyl methyl amine (Armeen M2HT) was obtained from Akzo Nobel Inc.

The dried olefinic interpolymer composition was prepared for electrical testing in both the Examples and Comparative Examples by blending 50 g of interpolymer composition in a Haake mixer equipped with cam mixing blades at 100° C. with 1 g of dicumyl peroxide, using a mixing speed of 55 rpm for 3 minutes. 12 grams of the interpolymer composition/peroxide blend were pressed between two Mylar® polyester sheets (DuPont Company) in a mold to prepare plaques that were 3.5" diameter and approximately 0.17 cm thickness. The plaques were crosslinked by pre-heating the press and mold at 375° F. (191° C.) for at least 3 minutes. The molds were loaded with interpolymer composition, pressed in a Tetrahedron Press to 20 tons of pressure for 3 minutes, cooled to 120° F. (49° C.) using 240 as the press rate setting, and maintained under these conditions for 3 minutes. Crosslinked 3.5" diameter plaques of approximately 0.17 cm thickness were obtained.

The dissipation factor of the plaques was measured according to ASTM D150 at 130° C. using a Tettex Model 2914 Test Cell for Solid Insulants. A Tettex Model 5283 Power Transformer supplied the voltage to the Test Cell. A Tettex Model 2966 Temperature Control Unit heated the Test Cell electrodes. Resistance was measured on the Tettex Model 5476A Resistance Bridge. (Tettex equipment from Tettex Corporation).

Examples 1–3 and Comparative Examples A–H

EPDM-1, an interpolymer composition having 70 wt % ethylene, 29.5 wt % propylene, 0.5 wt % ENB, a Mooney viscosity of 40 and 1.3 million grams (MM g) interpolymer/g titanium, was prepared. This composition was employed in Examples 1–3 and Comparative Examples A–G. In Example 1–3, various charge dissipation modifiers were added. In Comparative Example A, neither a charge dissipation modifier nor a deactivation agent was added. In Comparative Examples B–G, various deactivation agents were added. The dissipation factor of each was measured. Table 1 shows the type and amount of charge dissipation modifier (Examples) and deactivation agent (Comparative Examples) and the dissipation factor for each composition. Comparative Example H, which utilized EPDM-A is also included in this Table. EPDM-A was Nordel® 2722E (Du-Pont Dow Elastomers LLC), an EPDM composition commercially used in electrical applications which had 72 wt % ethylene, 23.6 wt % propylene, 4.4 wt % ENB, a Mooney viscosity of 27 and was produced with a conventional Ziegler-Natta catalyst and steam stripped. Charge dissipation modifier is designated "CDM" and deactivation agent is designated "DEA" in this Table and some later Tables as well.

TABLE 1

| Ex. and Comp. Ex. | Interpolymer Composition | CDM/DEA | Concentration CDM/DEA g per 8000 ml Solvent[5] | Dissipation Factor |
|---|---|---|---|---|
| Ex. 1 | EPDM-1 | Bis-tallowalkyl methyl amine | 48.8 g | 0.031 |
| Ex. 2 | EPDM-1 | Silica | 5.5 g | 0.021 |
| Ex. 3 | EPDM-1 | Phosphoric Acid | 8.9 g | 0.061 |
| Comp. Ex. A | EPDM-1 | None | — | 0.454 |
| Comp. Ex. B | EPDM-1 | Water | 1.6 g | 0.125 |
| Comp. Ex. C | EPDM-1 | IRGANOX ® 1010[3] and Water | 2.88 g/0.18 g | 0.156 |
| Comp. Ex. D | EPDM-1 | PEP-Q[4] | 94.2 g | 0.341 |
| Comp. Ex. E | EPDM-1 | Stearic Acid | 25.2 g | 0.195 |
| Comp. Ex. F | EPDM-1 | Methanol | 2.9 g | 0.149 |
| Comp. Ex. G | EPDM-1 | Tripropylphosphate | 19.3 g | 0.334 |
| Comp. Ex. H | EPDM-A | — | — | 0.003 |

[3]Pentaerythriol Terakis (3-(3,5-di-tert-butyl-4-hydroxyphenyl)propionate) from Ciba Specialty Chemicals Corp.
[4]Tetrakis(2,4-di-tert-butylphenyl)-4,4-biphenylene diphosphonite
[5]Values for a 454 g polymer/hr production rate, 1.3 MM g polymer/g Ti catalyst efficiency, and 8 g/minute modifier solution flow rate.

All of Comparative Examples A–G, including those treated with a deactivation agent, had higher dissipation factors than the commercially utilized composition and control, EPDM-A of Comp. Ex. H, which had been steam stripped. Comparative Example A, made with no deactivation agent, had the highest dissipation factor (0.454) of all the tested interpolymer compositions. When water was used as a deactivation agent (Comp. Ex. B), the dissipation factor was reduced from 0.454 to 0.125. Similarly, when methanol was used as the deactivation agent (Comp. Ex. F), the dissipation factor was reduced to 0.149. Thus, water and methanol are each somewhat effective at reducing the dissipation factor of the olefinic interpolymer composition. However, the dissipation factors of these Comparative Examples are still an order of magnitude too high for the compositions to be used in most electrical applications.

IRGANOX® 1010 and water were added as the deactivation agent in Comp. Ex. C and and PEP-Q was the deactivation agent in Comp. Ex. D. These deactivation agents are commonly used as additives and stabilizers against polymer decomposition. IRGANOX® 1010 is not a charge dissipation modifier of the invention. PEP-Q is a functionalized molecule containing phosphorus but also is not a charge dissipation modifier of the invention. As shown in Table 1, Comp. Ex. D had a dissipation factor of 0.341. Comp. Ex. C had a lower dissipation factor, 0.156. The lower dissipation factor of Comp. Ex. C is thought to be due mainly to the effect of the water. Again, these additives failed to reduce the dissipation factor of the interpolymer compositions to desirable levels below 0.10.

As in Comp. Ex. D, the deactivation agent used in Comp. Ex. G contained a phosphorus atom, but is not a charge dissipation modifier of the invention. Comp. Ex. G gave a fairly high dissipation factor (0.334), similar to the dissipation factor measured for Comp. Ex. D. The deactivation agents of both Comp. Exs. D and G contain phosphorus but are chemically different than phosphoric acid (Ex. 3) which is a charge dissipation modifier of the invention.

Comparative Example E had a dissipation factor of 0.195. The deactivation agent in this comparative example was stearic acid, which contains an acid functionality but failed to reduce the dissipation factor of the olefinic interpolymer composition to levels desirable for use in most electrical applications.

Surprisingly, the interpolymer compositions of Examples 1–3, although treated with charge dissipation modifiers that were quite different in chemical structure and composition, each had significantly improved dissipation factors relative to Comparative Examples A–G. As shown in Table 1, Examples 1–3 had dissipation factors of 0.031, 0.021, and 0.061, respectively. These dissipation factors are almost an order of magnitude better than those obtained from Comparative Examples A–G. In addition, the dissipation factors of Ex. 1 and Ex. 2 represent a 93–95% reduction and Ex. 3 an 87% reduction in dissipation factor compared to the untreated interpolymer composition (Comp. Ex. A). Further, the dissipation factors of these three Examples represent a 51–83% reduction in dissipation factor compared to water treated interpolymer composition of Comp. Ex. B. Although Examples 1–3 did not have dissipation factors as low as that of Comp. Ex. H, the dissipation factors of the Examples are low enough to meet the electrical requirements for most low voltage applications without the disadvantage of the additional steps of steam stripping and disposing of the steam stripping waste stream that are associated with Comp. Ex. H.

Examples 4–8 and Comparative Example I

EPDM-2, an interpolymer composition having 70 wt % ethylene, 29.5 wt % propylene, 0.5 wt % ENB, a Mooney viscosity of 22 and 0.53 million grams (MM g) interpolymer/g titanium, was prepared using water as the catalyst deactivation agent. This composition was employed in Examples 4–8 and Comparative Example I.

In Examples 4–8, various charge dissipation modifiers were blended with EPDM-2. Each charge dissipation modifier was blended with 50 grams of EPDM-2 at a temperature of 70° C. and a mixing speed of 55 rpm for 5 minutes in a Haake mixer equipped with cam mixing blades. Dicumyl peroxide (1.0 g) was then added and the blend mixed for an additional 3 minutes in the Haake mixer at 100° C. and a mixing speed of 55 rpm. The blended samples were then pressed into plaques and cured according to the procedure described above. The plaques were then tested at 130° C. according to ASTM D150. The type and amount of modifier added and the resulting dissipation factor of the blended examples is shown in Table 2.

TABLE 2

| Example/ Comp. Ex. | Interpolymer Composition | Charge Dissipation Modifier | Amount of CDM added (g) | Dissipation Factor |
|---|---|---|---|---|
| Comp. Ex. I | EPDM-2 | None | — | 0.068 |
| 4 | EPDM-2 | Aniline | 0.261 | 0.009 |
| 5 | EPDM-2 | Pyridine | 0.281 | 0.002 |
| 6 | EPDM-2 | Isopropylamine | 0.225 | 0.008 |
| 7 | EPDM-2 | 25% ammonia and 75% water | 0.323 | 0.007 |
| 8 | EPDM-2 | Bis-tallowalkyl methyl amine | 0.530 | 0.017 |

Examples 9 and 10 and Comparative Example J

EPDM-3, an interpolymer composition having 70 wt % ethylene, 29.5 wt % propylene, 0.5 wt % ENB, a Mooney viscosity of 22 and 0.56 million grams (MM g) interpolymer/g titanium, was prepared in the same way as EPDM-2 except that, for Example 9, a charge dissipation modifier was added to the interpolymer solution before the solvent was removed. The EPDM-3 composition, absent the modifier, was employed in Comparative Example J. The interpolymer composition of Example 10 was prepared by blending 25 grams of EPDM-3 with 25 grams of the Example 9 composition for 5 min. using a Haake mixer followed by treatment with peroxide and plaque preparation. Results are shown in Table 3.

The dissipation factor of Ex. 9 was more than 50% less than that of Comp. Ex. J, the same composition but which had not been treated with a charge dissipation modifier. Further blending the composition of Ex. 9 with equal parts of Comp. Ex. J reduced the dissipation factor by an order of magnitude (Ex. 10). Thus, the dissipation factor of an interpolymer composition can be reduced by sufficiently contacting it with a composition containing excess charge dissipation modifier.

TABLE 3

| Example/ Comp. Ex. | Interpolymer Composition | Charge Dissipation Modifier | Amount of CDM in Interpolymer Composition (g) | Dissipation Factor |
|---|---|---|---|---|
| Comp. Ex. J | EPDM-3 | None | — | 0.0629 |
| Ex. 9 | EPDM-3 | Bis-tallowalkyl methyl amine | 0.989 | 0.0300 |
| Ex. 10 | EPDM-3 | Bis-tallowalkyl methyl amine | 0.49 | 0.0032 |

Comparative Examples K and L

EPDM-4 was prepared by the process described above at the beginning of the Examples section except the boron containing activator package was a combination of N,N-bis (tallowalkyl)-N-methylammonium tetrakis(2,3,4,5,6-pentafluorophenyl)borate (Boulder Scientific Company) and MMAO (Akzo-Nobel). The process yielded an interpolymer composition having 70 wt % ethylene, 29.5 wt % propylene, 0.5 wt % ENB, a Mooney viscosity of 20 and 2.14 MM g interpolymer/g titanium. This composition, EPDM-4, was employed in Comparative Examples K and L. In Comparative Example L, EPDM-4 was blended with the charge dissipation modifier of Table 4 and the dissipation factor measured.

As Table 4 shows, addition of a charge dissipation modifier of this invention to an EPDM prepared with borate activators is not effective in reducing the dissipation factor. In fact, the dissipation factor increased.

TABLE 4

| Comp. Ex. | Interpolymer Composition | Charge Dissipation Modifier | Amount of CDM added (g) | Dissipation Factor |
|---|---|---|---|---|
| K | EPDM-5 | None | — | 0.093 |
| L | EPDM-5 | Bis-tallowalkyl methyl amine | 0.497 | 0.512 |

What we claim is:

1. A method for making an olefinic interpolymer composition having a low dissipation factor, said method comprising adding at least one charge dissipation modifier to an unmodified olefinic interpolymer composition, and wherein the unmodified olefinic interpolymer composition comprising the following:
   a) an olefinic interpolymer or a mixture of olefinic interpolymers, each comprising at least one $C_2$–$C_{20}$ α-olefin monomer, and optionally comprising at least one polyene, and
   b) post-polymerization reactor residuals of at least one transition metal catalyst and a boron containing activator package; and
   wherein the at least one charge dissipation modifier is selected from the group consisting of:
   i) amine compounds of the general formula (I) and (II):

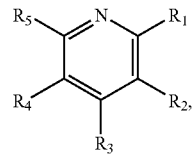

wherein x is 3, and each R is independently selected from linear, branched and cyclic hydrocarbyl groups and hydrogen, or together two or more R substituents are a cyclic hydrocarbyl group, and each $R_{1-5}$ is independently selected from linear, branched and cyclic hydrocarbyl groups and hydrogen, or together two or more of the $R_{1-5}$ substituents are a cyclic hydrocarbyl group;
   ii) silica compounds; and
   iii) phosphoric acid; and
   iv) and mixtures thereof; and
       wherein the olefinic interpolymer composition has a dissipation factor which is at least 50% lower than the dissipation factor of the unmodified olefinic interpolymer composition.

2. The method of claim 1, wherein the at least one charge dissipation modifier is added to a solution comprising the unmodified olefinic interpolymer composition and a solvent.

3. The method of claim 2, wherein the solution is formed from a solution polymerization process.

4. The method of claim 3, wherein the solution polymerization process takes place in a continuous reactor process comprising one or more reactors.

5. The method of claim 4, wherein the at least one charge dissipation modifier is added to the solution, at any point after the solution leaves the last reactor, and when the unmodified olefinic interpolymer composition is still in solution.

6. The method of claim 3, wherein the solution polymerization process takes place in a batch reactor process.

7. The method of claim 6, wherein the at least one charge dissipation modifier is added to the reaction, after the reaction has reached its desired level of completion.

8. The method of claim 1, wherein the at least one charge dissipation modifier is added, after the unmodified olefinic composition has been isolated, as a solid, from a solution, slurry or gas phase process.

9. The method of claim 8, wherein the at least one charge dissipation modifier and the unmodified olefinic composition are mixed together using a melt blending apparatus.

10. The method of claim 1, wherein the at least one charge dissipation modifier is selected from the group consisting of aniline, isopropylamine, pyridine, and N,N-octadecyl methyl amine.

11. The method of claim 1, wherein the at least one charge dissipation modifier is a silica compound.

12. The method of claim 1, wherein the at least one charge dissipation modifier is phosphoric acid.

13. The method of claim 1, wherein the at least one $C_2$–$C_{20}$ α-olefin monomer is selected from the group consisting of ethylene, propylene, 1-butene, 1-hexene, 1-octene, and 4-methyl-1-pentene.

14. The method of claim 1, wherein the at least one olefinic interpolymer comprises two α-olefin monomers.

15. The method of claim 14, wherein the α-olefin monomers are ethylene and octene-1.

16. The method of claim 1, wherein the α-olefin monomers are ethylene and butene-1.

17. The method of claim 1, wherein the unmodified olefinic interpolymer composition comprising a mixture of olefinic interpolymers, each comprising two or three α-olefin monomers selected from the group consisting of ethylene, propylene, butene-1 and octene-1.

18. The method of claim 1, wherein the olefinic interpolymer comprises at least one polyene.

19. The method of claim 18, wherein the polyene is selected from the group consisting of 5-ethylidene-2-norbornene and 5-vinyl-2-norbornene.

20. The method of claim 1, wherein the olefinic interpolymer composition has a dissipation factor of less than 0.12.

* * * * *